United States Patent [19]

Hallerback

[11] 4,065,190

[45] Dec. 27, 1977

[54] SELF ADJUSTING ELEVATING TEMPERATURE BEARING AND HOUSING

[75] Inventor: Stig Lennart Hallerback, Vastra Frolunda, Sweden

[73] Assignee: SKF Industrial Trading and Development Company, B.V., Jutphaas, Netherlands

[21] Appl. No.: 681,718

[22] Filed: Apr. 29, 1976

Related U.S. Application Data

[63] Continuation-in-part of Ser. No. 566,080, April 8, 1975, abandoned.

[30] Foreign Application Priority Data

May 3, 1974   Sweden ............................... 7405905

[51] Int. Cl.$^2$ ..................... F16C 17/22; F16C 27/00; F16C 35/00; F16C 39/00
[52] U.S. Cl. ................................ 308/15; 29/149.5 R; 308/72; 308/238
[58] Field of Search ................. 29/149.5; 308/238, 15, 308/72, 239

[56] References Cited

U.S. PATENT DOCUMENTS

| | | | |
|---|---|---|---|
| 2,983,562 | 5/1961 | Runton et al. | 308/238 |
| 2,998,637 | 9/1961 | Wallis | 29/149.5 |

*Primary Examiner*—Robert J. Spar
*Assistant Examiner*—Howard Beltran
*Attorney, Agent, or Firm*—Eugene E. Renz, Jr.

[57] ABSTRACT

A mount for a bearing comprising a hub portion having a cylindrical surface defining a seat of a predetermined diametral dimension to firmly support a race ring of the bearing. The mount is made of a molding material having a different longitudinal expansion coefficient than the bearing ring and a spiral cast in the molding material and made of a material having the same longitudinal expansion coefficient as the bearing ring. The spiral is mounted in a predetermined position so that at least a portion thereof forms the surface defining the seat. In the preferred embodiment, the spiral is in direct contact with the bearing ring.

9 Claims, 6 Drawing Figures

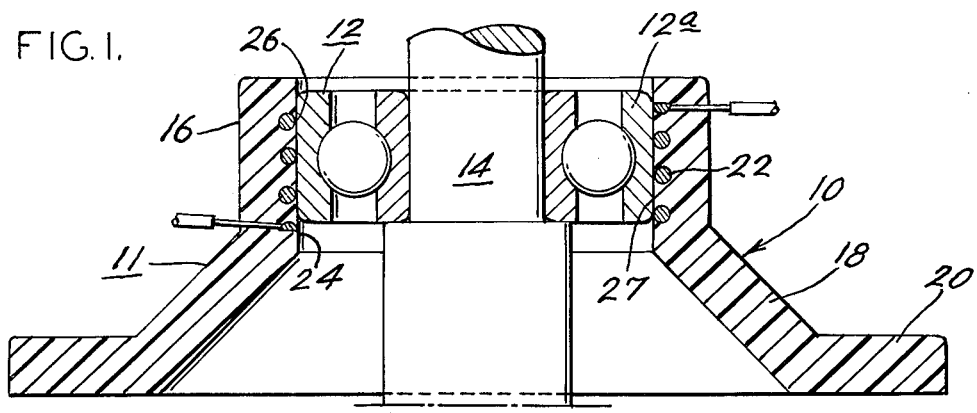
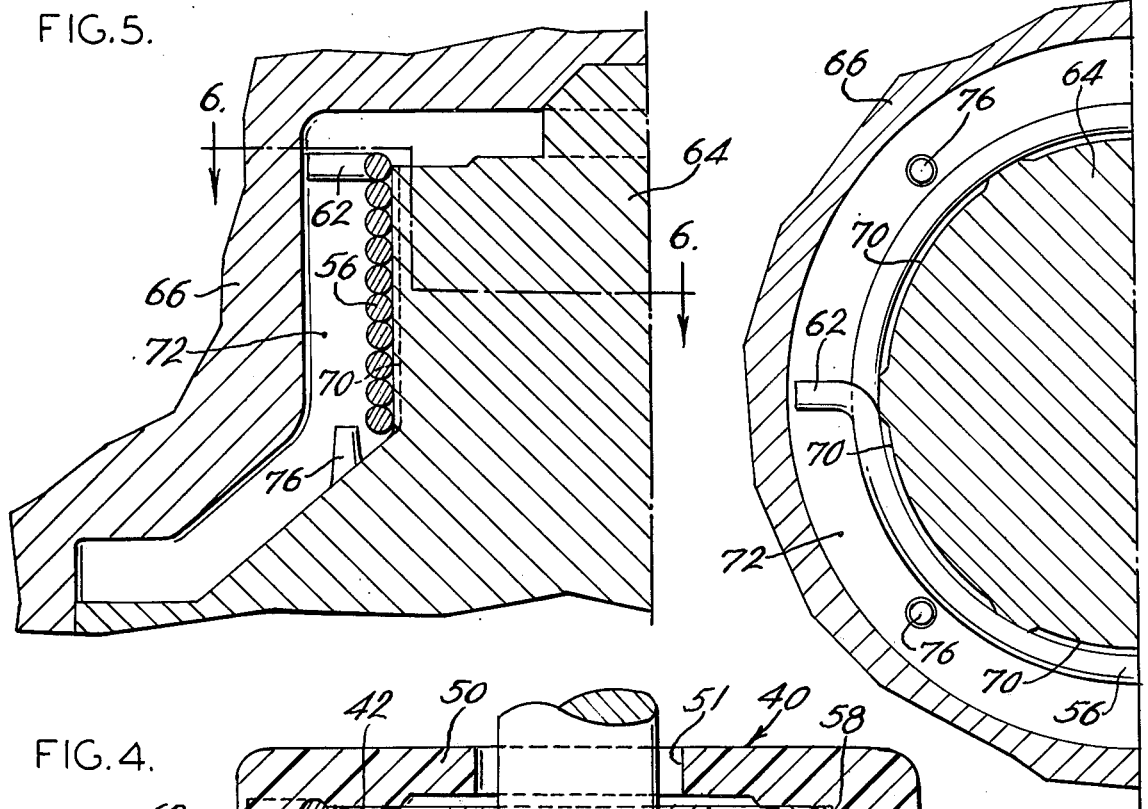
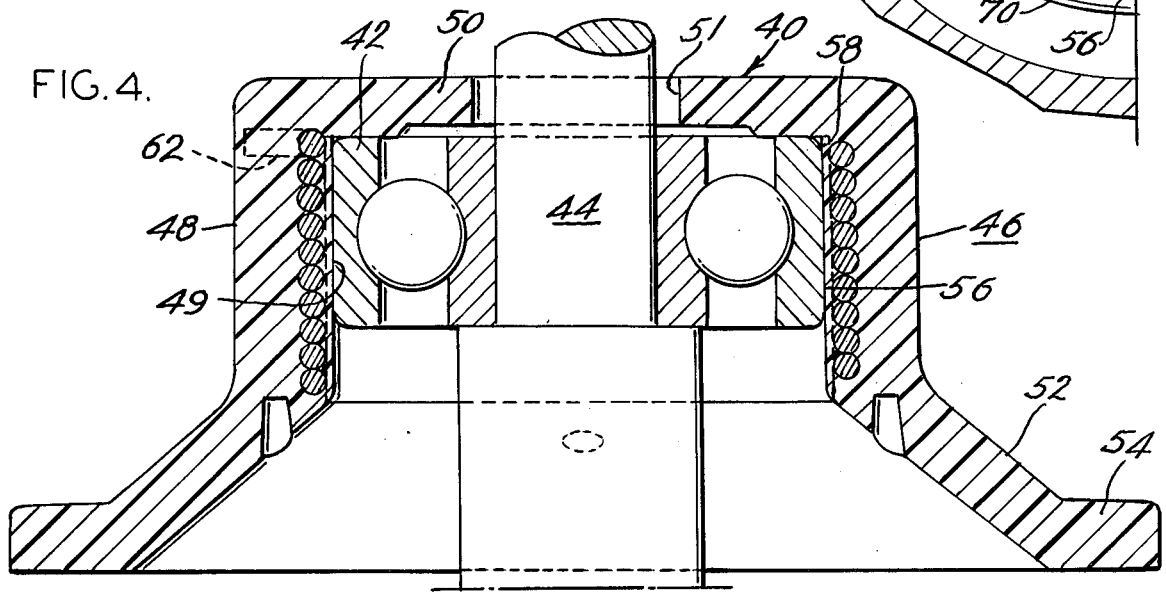

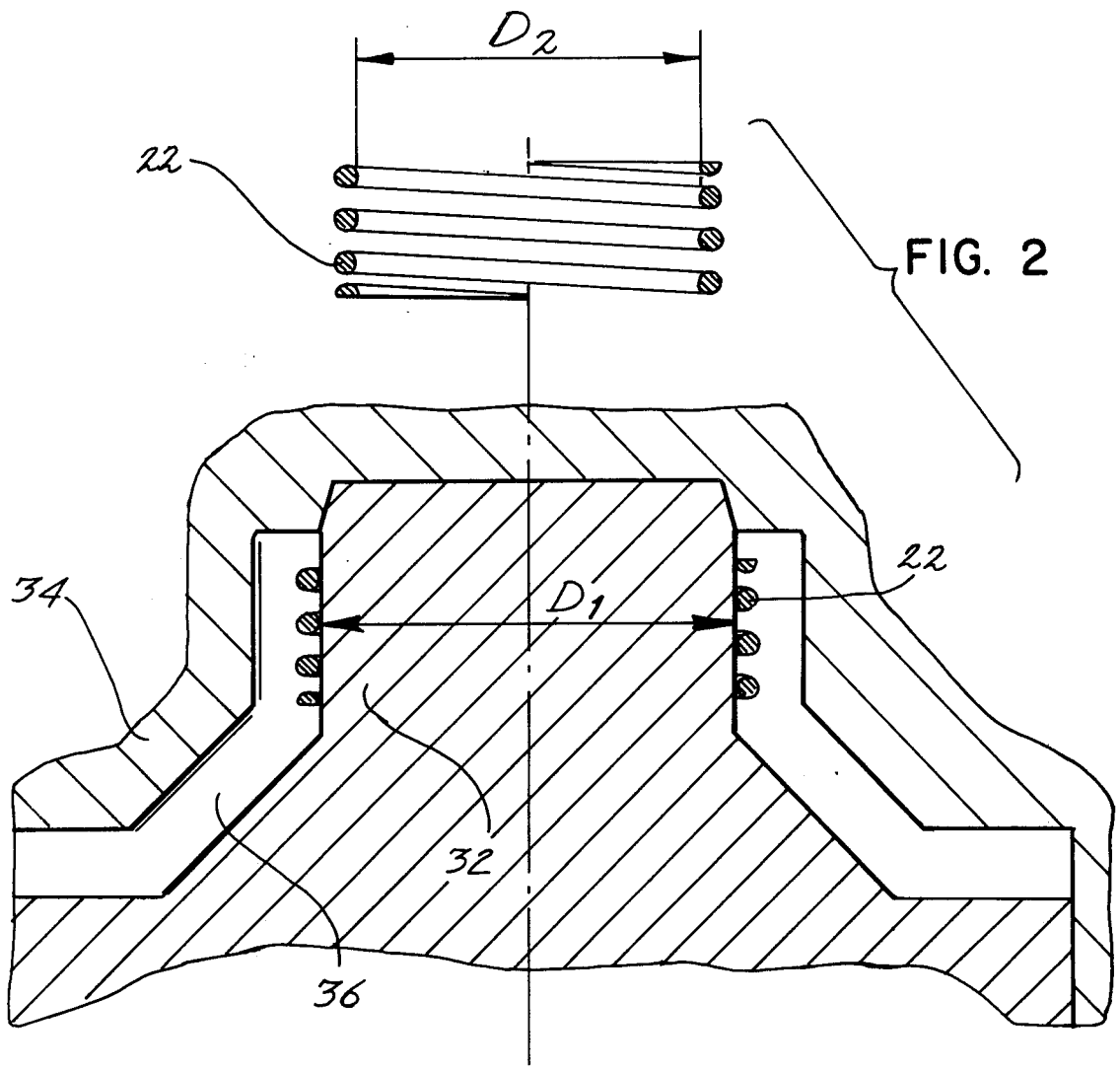

SELF ADJUSTING ELEVATING TEMPERATURE BEARING AND HOUSING

This application is a continuation-in-part of my earlier application entitled "Bearing Seat And Method for the Production Thereof" filed Apr. 8, 1975, Ser. No. 566,080 now abandoned.

BACKGROUND OF THE INVENTION

The present invention relates to a new and improved bearing mount or seat for rolling bearings.

These bearing mounts are typically used in rotating machines such as electric motors to support the rotor concentrically in the stator and usually comprise a cup-shaped housing within which is mounted a bearing journalling the rotor shaft and an outwardly projecting wall connected to the stator. For proper functioning of the machine, it is important that the rotating part be supported relative to the stationary part in a highly accurate manner and that the accuracy be maintained during the lifetime of the machine. An important consideration in assemblies of this type is that the play between the outer ring of the bearing, usually a ball bearing, and the housing varies only within certain predetermined limits to permit some movement of the outer ring in an axial direction to avoid development of unacceptable, harmful axial forces but that the play nevertheless is in a range preventing so called "creep" of the outer ring in the bearing seat.

The housing mounting the bearing for the rotating part in apparatus of the above type is usually made of metal such as steel, cast iron or aluminum. In some instances it is advantageous to make the housing or shield of a plastic material for technical and economic reasons. However, the large differential between the longitudinal expansion coefficient of plastic and steel presents certain serious drawbacks. For example, by reason of this differential, the play between the outer ring of the bearing and seat will vary appreciably at the different temperature conditions. At low temperatures there is a risk of seizing or locking the outer ring in the housing which in turn produces large axial forces on the bearing. At elevated temperatures the play is increased to such an extent that the outer ring rotates in the bearing seat thereby contributing to premature wear of the bearing. A further disadvantage of plastic bearing seats is that in those applications where a tight fit between the outer ring and the bearing seat is required, the plastic material tends to flow due to the influence of tension forces and the tight fit gradually deteriorates into a loose fit.

In order to solve some of the above problems, it has been proposed to cast a steel ring in the plastic, the steel ring having the same longitudinal expansion coefficient as the ring of the bearing mounted in the seat. The steel ring is firmly attached to the plastic by means of a groove or the like. While this bearing seat has the advantage of stability, both with regard to mechanical strength and independence of temperature variations, the method for making this assembly on a large scale basis is quite expensive. For example, the bearing seat is produced by placing the steel ring at room temperature on a hot mandrel and thereafter casting the plastic. This operation is followed by costly turning of the inner side of the steel ring to a precise dimension to accomodate the ring of the bearing. The steel ring must have a certain play to fit on the mandrel, which play increases when the steel ring is heated to casting temperature, i.e., about 200° C. It is noted that the mandrel from the previous casting operation already is at this temperature. It has also been observed that the steel ring has a tendency to hang on the mandrel and thus assume an eccentric position in the bearing shield. As a result, it is often necessary to subject the steel ring to a costly after treatment by turning or the like.

SUMMARY OF THE INVENTION

With the above in mind, an object of the present invention is to provide a simple and inexpensive bearing seat which even when subjected to varying temperature conditions, maintains its tolerences so that the play is not materially changed. This is accomplished according to the present invention by casting material having a different longitudinal expansion coefficient than the one of the bearing, such as plastic, and positioning a spiral of a material having the same longitudinal expansion coefficient as the material of the bearing ring in the casting material so that a portion of the spiral forms the surface confronting the bearing. In accordance with the preferred embodiment of the present invention the spiral is positioned in the surface of the bearing seat so that there is direct contact between the spiral and the bearing without any intermediate casting material.

The bearing seat is suitably made of a plastic material such as epoxy plastic and the bearing and spiral should consist of the same material, usually bearing steel.

In another form of the present invention, the bearing seat comprises the same elements except that it includes a small layer of plastic at the inner circumference of the spiral at circumferentially spaced, selected locations. It has been found that a seat cast in this manner is somewhat more efficient from a production standpoint. For example, when the spiral is in tight contact with the mandrel, in some instances there is an air lock created upon introducing the molten plastic material. This is obviated in accordance with the alternate method by providing a small clearance between the mandrel and the spiral. This clearance may be achieved in the casting operation by forming a series of longitudinally extending, circumferentially spaced ribs on the mandrel which project radially outwardly approximately 0.1 to 0.2 mm. It is noted that the small layer of plastic at the inner face of the spiral is small enough so that the plastic does not tend to flow and consequently, the attendant disadvantages of material flow are not present.

In accordance with the preferred method for making a bearing seat according to the present invention, a spiral is positioned on a cylindrical mandrel or into a cylindrical mold cavity, the spiral being of a predetermined calculated diameter somewhat less than the diameter of the mandrel or greater than the diameter of the mold cavity and being of a material having the same longitudinal expansion coefficient as the material of a ring of the bearing. With the spiral position in this manner, a material having a different longitudinal expansion coefficient, for example, plastic, is cast around the spiral and upon cooling, forms the finished bearing seat. In order to insure a firm bonding between the spiral and the plastic it is advantageous to clean the spiral before casting, for example, by sand blasting.

For some purposes, it is desirable that the bearing may be electrically connected to ground. This may be accomplished by providing the spiral with terminals for electric wires connected to ground which in turn grounds the bearing since the spiral is an electrically conducting contact therewith.

BRIEF DESCRIPTION OF THE DRAWINGS

The above and other objects of the present invention are hereinafter more fully set forth with reference to the accompanying drawings, wherein:

FIG. 1 is a sectional view of a bearing mount in accordance with the present invention for mounting a ball bearing assembly;

FIG. 2 is a schematic view showing the preferred method for making a bearing mount of the type shown in FIG. 1;

FIG. 4 is a sectional view of a modified bearing mount made in accordance with the present invention; and FIGS. 5 and 6 are fragmentary views schematically illustrating a method for making a bearing mount of the type shown in FIG. 4.

DETAILED DESCRIPTION OF SPECIFIC EMBODIMENTS

Figure 3:
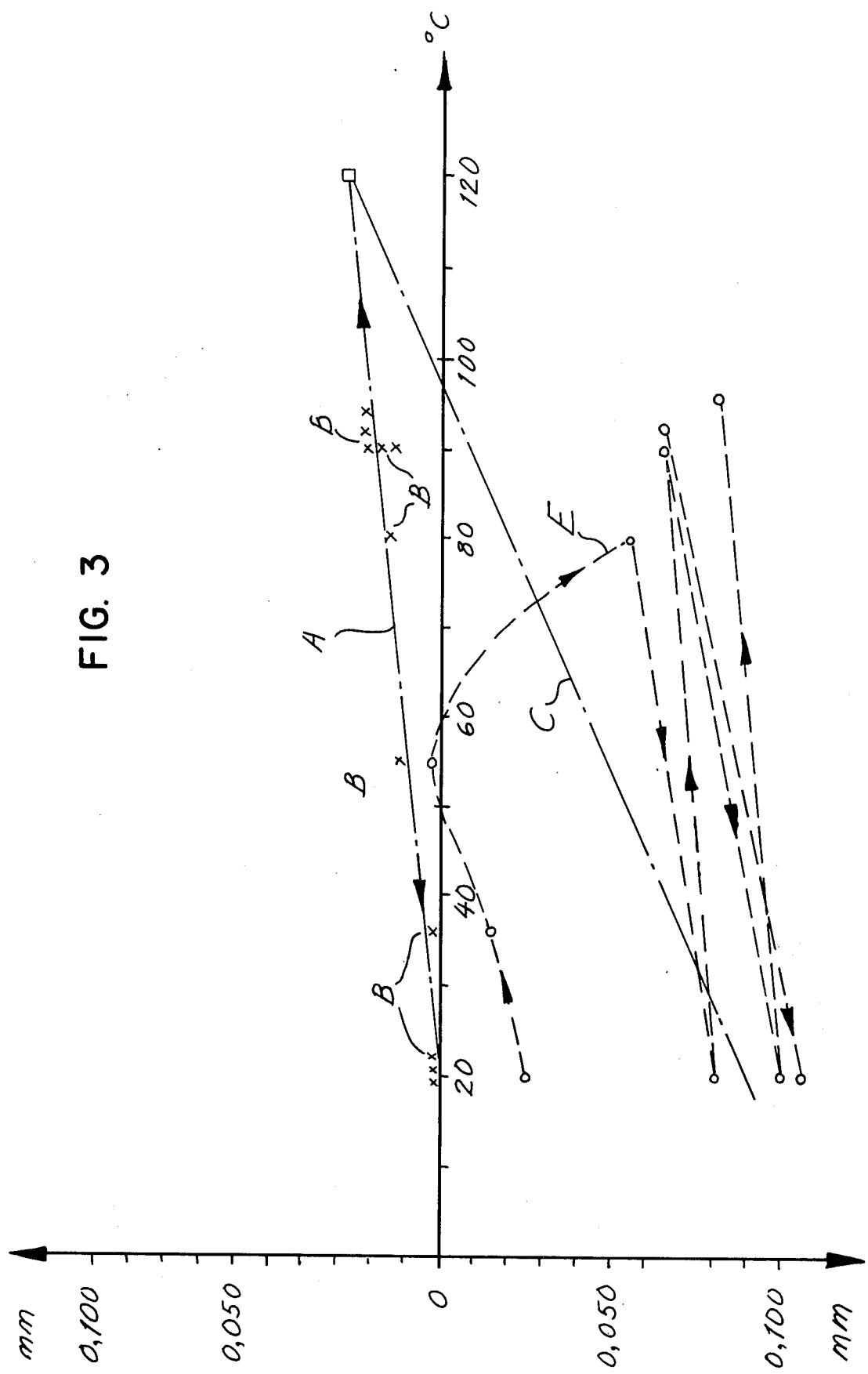
FIG. 3 is a chart of curves showing the results of a bearing mount produced according to the present invention and a similar seat consisting only of plastic.

Referring now to the drawings and particularly FIG. 1 thereof, there is illustrated a bearing mount or seat 10 in accordance with the present invention. In the present instance the mount 10 supports a conventional ball bearing assembly 12 which journals a rotatable member such as a shaft 14 for a rotor of an electric machine. The mount 10 comprises a body portion 11, preferably of a curable plastic, consisting of a generally cylindrical hub section 16 having an outwardly flared flange section 18 terminating in a radially directed lip 20 adapted to be connected to, for example, the stator of the electric machine. The bearing mount has cast therein a spiral member 22 made of a material having preferably the same longitudinal coefficient of expansion as the outer ring 12a of the bearing. The spiral member 22 is, as illustrated, disposed in the inner cylindrical surface 24 of the hub section 16 and in the present instance, the cylindrical trace 26 of the spiral forms part of the support surface or seat 27 for the outer ring 12a of the bearing and is in direct contact therewith. The seat 27 is of a predetermined diametral dimension relative to the diameter of the outer ring 12a of the bearing to provide the desired fit to firmly support the bearing in place without play. In this manner, the economies of an essentially all plastic mount are retained without the disadvantages of variations in play due to temperature differentials noted above by reason of the steel spiral member which forms an integral part of the support surface.

To test the invention two bearing seats in the shape of race rings were made, one of which consisted of only epoxy plastic reinforced with silica powder and the second of the same material but having a molded-in steel spiral according to the invention. The spiral is made of a steel having a thermal expansion coefficient of about $10^{-6}$ and the reinforced epoxy plastic has a thermal expansion coefficient about 2 to 4 times greater than the steel.

The rings were cured at 120° C during 20 hours. Their nominal diameter was 19.000 mm. The number of turns of the spiral was three, and this was molded in at the inner side of the ring. After being removed from the mold the rings were heated several times between 20° C and 90° C. It appeared then that the ring according to the invention followed the same curve as a steel ring and always returned to its initial calculated value. Contrary to that the plastic ring initially shrinked to somewhat below the nominal value but shrinked furthermore very much after a heating at 80° C. This was mainly due to the fact that tensions in the plastic were released when heating. Several heating cycles reduced the dimension further.

On FIG. 3 the heating cycles of a steel cylinder are shown by the curve A. The points B show the values for the ring according to the invention. Curve C shows the theoretical curve for the plastic ring and the curve E shows the real curve of the plastic ring.

The diagram has been made up for rings having a nominal diameter value of 19.000 mm, and the ordinate shows the increase and the decrease of the diameter, while along the abscissa the temperatures of the rings have been plotted. The rings have been cured at 120° C.

As clearly appears from the figure it is difficult or practically impossible to predict the final diameter for a pure plastic ring. If, therefore, one should use a pure plastic ring one had to try out the size of the diameter of the mandrel as this one cannot be calculated in advance. These problems do not occur with the method according to the invention.

There is schematically illustrated in FIG. 2 a method for making a bearing mount of the type described above. The method is a casting process wherein a spiral 22 having a diameter $D_2$ slightly smaller than the diameter $D_1$ of a mandrel 32 is positioned on the mandrel as shown so that it snugly embraces the mandrel with a rubbing fit. The mandrel 32 is then placed in a female mold part 34 defining therebetween a cavity 36 generally of the shape of the finished bearing mount. A suitable inlet (not shown) to the cavity 36 provides a means for charging the cavity with a plastic, usually a curable plastic. After injection of plastic and suitable curing time the bearing mount is formed.

The bearing mount produced in this manner has a longitudinal expansion coefficient the same as that of the spiral. The spiral 22 consists usually of a steel similar to the outer ring 12a of the bearing. As the plastic has a greater longitudinal expansion coefficient than steel and the curing was carried out in an elevated temperature, the steel spiral 22 will then be prestressed after the cooling or curing. Thus, the bearing seat consisting of the steel spiral and plastic will have the same heat expansion coefficient as the bearing ring. Due to the fact that the spiral 22 is positioned on the mandrel 32 before introducing the plastic, the inner surface of the spiral (trace 26) is thus exposed and engages the outer ring of the bearing. In this manner the risk of flowing of plastic material due to high pressure is eliminated. A further advantage of the method is that the bearing mount may be cast to finished dimension and does not require any after treatment, the diameter of the mandrel being chosen to provide the desired fit with the outer ring of the bearing.

There is illustrated in FIG. 4 a modified form of bearing mount 40 in accordance with the present invention. As illustrated, the mount 40 is suitable for supporting a conventional ball bearing assembly 42 which journals a rotatable shaft 44 for a rotor of an electric machine. The general construction of the bearing mount 40 is similar to that previously described and includes a body portion 46 preferably of a moldable plastic material consisting of a hub section 48, the inner surface of which defines the seat 49 for the bearing, an inwardly directed flange 50 projecting from one end of the hub and having a central opening 51 through which the shaft 44 projects, an outwardly flared wall 52 terminating in a radially outwardly directed lip 54 at the other end of the hub. A spiral member 56 having a longitudinal coefficient of expansion identical to the outer ring of the bearing is integrally molded in the hub section 48 adjacent the inner periphery thereof defining the seat 49 for the bearing.

In the present instance a series of thin layers 58 of the plastic material confront the inner cylindrical trace of the spiral member 56 at circumferentially spaced locations. Intermediate the layers 58, the spiral member is exposed and confronts the surface of the bearing ring mounted therein. Note also that in the present instance the one end of the spiral member 56 has a radially directed arm extension 62 which locks the spiral in place in the hub portion 48. The radial thickness of the layers 58 is preferably between 0.1 to 0.2 mm.

FIGS. 5 and 6 show the mold parts for making a bearing mount of FIG. 4, described above. The male and female mold parts 64 and 66 are generally similar to the previously described mold parts except that in the present instance the cylindrical portion of the mandrel is provided with a series of circumferentially spaced longitudinally extending cavities or recesses of a radial depth of between 0.1 and 0.2 mm. A suitable injection passage is provided in the female mold part for charging the mold cavity 72. Accordingly, in accordance with the method for making a mount of FIG. 4, a spiral member 56 is mounted on the cylindrical extension 64 of the mandrel. The mandrel is then inserted into the female mold part 66 until it is bottomed therein and thereafter the cavity is charged with a curable plastic material. As the mold cavity 72 is charged, the passageway 70 provides air relief gaps permitting air locked between the spiral and mandrel to escape during the charging operation. The radial arm extension 62 combined with a series of axial lugs 76 on the mandrel secure the spiral in place preventing movement thereof when the molten plastic is introduced into the cavity at high speed and pressure.

Usually a bearing is mounted by inserting the outer ring into a bearing seat, while the inner ring surrounds the rotating shaft. The case may, however, be the opposite and one will then cast the bearing seat according to the invention with the spiral directed outwards in a cylindrical surface, which shall be fit in the inner ring. Instead of having the spiral on a cylindrical mandrel having a larger diameter than the spiral, one will in this case insert it into a mold cavity having a smaller diameter than the spiral. The method is otherwise unchanged.

The invention is not limited to the embodiment examples shown but can be varied in different ways within the scope of the claims.

I claim:

1. A bearing housing which is subjected to varying temperatures for mounting an annular bearing element including a section having a generally cylindrical surface defining a seat of a predetermined diametral dimension in relation to the annular bearing element to firmly support the same and formed of a molding material having a first longitudinal expansion coefficient and a spiral cast in the molding material having at least a portion thereof confronting the annular bearing element when mounted in the seat, said spiral being of a material having a second longitudinal expansion coefficient the same as the annular bearing element and different from said molding material, said section of the bearing housing with the spiral cast therein providing a seat having substantially the same heat expansion coefficient as the annular bearing member.

2. A bearing housing as claimed in claim 1 wherein the inner peripheral surface of said spiral directly engages the annular bearing element.

3. A bearing housing as claimed in claim 1 wherein said annular bearing element engages interiorly of said cylindrical surface of said seat.

4. A bearing housing as claimed in claim 1 wherein said annular bearing element forms an outer ring of a ball bearing assembly.

5. A bearing housing as claimed in claim 1 wherein said spiral is made of a steel having a thermal expansion coefficient of about $10-6$ and said molding material is a reinforced epoxy plastic having a thermal expansion coefficient about 2 to 4 times greater than said spiral.

6. A bearing housing as claimed in claim 1 wherein the bearing element and spiral are the same material.

7. A bearing housing as claimed in claim 6 wherein said spiral and bearing element are made of steel and the said molding material is plastic.

8. A bearing housing as claimed in claim 1 wherein the spiral includes terminals for connection of electric wires thereto.

9. A bearing housing as claimed in claim 1 including a thin layer of the molding material between said spiral and the bearing element.

* * * * *

UNITED STATES PATENT AND TRADEMARK OFFICE
CERTIFICATE OF CORRECTION

PATENT NO. : 4,065,190
DATED : December 27, 1977
INVENTOR(S) : Stig Lennart Hallerback It is certified that error appears in the above-identified patent and that said Letters Patent are hereby corrected as shown below:

Column 6,
(34) Change "10-6" to "$10^{-6}$"

Signed and Sealed this

Ninth Day of May 1978

[SEAL]

Attest:

RUTH C. MASON
Attesting Officer

LUTRELLE F. PARKER
Acting Commissioner of Patents and Trademarks